United States Patent [19]

Cantu et al.

[11] Patent Number: 4,848,467
[45] Date of Patent: Jul. 18, 1989

[54] FORMATION FRACTURING PROCESS

[75] Inventors: Lisa A. Cantu, Ponca City, Okla.; Edward F. McBride, Wilmington, Del.; Marion W. Osborne, Houston, Tex.

[73] Assignees: Conoco Inc., Ponca City, Okla.; E. I. Du Pont de Nemours and Company, Wilmington, Del.

[21] Appl. No.: 155,786

[22] Filed: Feb. 16, 1988

[51] Int. Cl.$^4$ ............................................. E21B 43/26
[52] U.S. Cl. .................................. 166/281; 166/283; 166/300; 166/308; 252/8.551
[58] Field of Search ............... 166/281, 282, 283, 307, 166/308, 300; 523/130; 252/8.551, 8.553

[56] References Cited

U.S. PATENT DOCUMENTS

| | | | |
|---|---|---|---|
| 3,868,998 | 3/1975 | Lybarger et al. | 166/308 X |
| 3,960,736 | 6/1976 | Free et al. | 166/283 X |
| 4,343,363 | 8/1982 | Norton et al. | 166/281 |
| 4,387,769 | 6/1983 | Erbstoesser et al. | 166/283 |
| 4,470,915 | 9/1984 | Conway | 166/308 X |
| 4,526,695 | 7/1985 | Erbstoesser et al. | 252/8.551 |
| 4,541,485 | 9/1985 | Block | 166/281 |
| 4,715,967 | 12/1987 | Bellis et al. | 166/283 X |

Primary Examiner—George A. Suchfield

[57] ABSTRACT

Hydroxyacetic acid condensation product is used as a fluid loss material in a formation fracturing process in which a fracturing fluid comprising a hydrolyzable aqueous gel is used. The hydroxyacetic acid condensation product degrades at formation conditions to provide hydroxyacetic acid which breaks the aqueous gel, which provides restored formation permeability without the need for separate addition of gel breaker.

8 Claims, No Drawings

FORMATION FRACTURING PROCESS

TECHNICAL FIELD

This invention relates to a process for fracturing a subterranean formation such as an oil and/or gas producing formation in order to increase the effective permeability in a portion of the formation surrounding a wellbore penetrating the formation and to enhance the productivity or injectivity of the well.

More particularly, the invention relates to an improved process for removing a gel filter pad which typically builds up on the surfaces of a wellbore and on fractures resulting from fracturing the formation using an aqueous gel material as a part of the fracturing fluid.

BACKGROUND AND SUMMARY OF THE INVENTION

Hydraulic fracturing of subterranean formations is an old and highly developed process, used primarily to increase the permeability of a portion of a formation surrounding a wellbore. The process may be applied to new wells to increase productivity, or to old wells to increase or restore productivity. The process is also applicable to injection wells used in secondary recovery or fluid disposal operations.

In a typical fracturing process, a thickened fluid such as an aqueous gel or an emulsion is utilized. The thickened fluid increases the fracturing effect and also supports proppant material which is deposited in the fractures created by the process. In many cases, a fluid loss additive material is included with the fracturing fluid to further enhance the results. A common fluid loss additive material is silica flour. Many other natural and synthetic solid materials have been utilized as fluid loss additives in fracturing processes.

A detailed description of the hydraulic fracturing process, including a recitation of suitable gelling agents useful therein, is found in U.S. Pat. No. 4,470,915 to Conway.

When solid fluid loss additives are included in the fracturing fluid, a gel filter pad comprising fluid loss additive and concentrated gel material forms on the surfaces of the wellbore and the fractures creates by the process. Ideally, this gel filter pad is subsequently removed by backflow of fluid from the formation (except in the case of injection wells), but in actual practice, it is usually necessary to follow the treatment with gel breaking and/or gel filter pad removal steps. These steps often only recover a small fraction of the potential productivity of the well.

A fracturing fluid comprised of an aqueous gel and a hydrolyzable organic ester which breaks the gel is described in U.S. Pat. No. 3,960,736 to Oree et al. That patent does not suggest that the organic ester is used in an amount or form to provide fluid loss properties to the treatment fluid.

U.S. Pat. Nos. 4,387,769 and 4,526,695 to Erbstoesser et al. describe use of a polyester polymer as a fluid loss additive material. The polymers degrade at formation conditions to facilitate removal from the treated well.

U.S. Pat. No. 3,868,998 to Lybarger et al. describes a process for placing a self-cleaning pack of particles in a formation utilizing a solution of a slowly reactive acid-yielding material.

U.S. Pat. No. 4,715,967 to Bellis et al. describes a condensation product of hydroxyacetic acid with itself or other compounds, the condensation product having the ability to provide fluid loss properties to a fluid and being degradable at formation conditions. The condensation products described in that patent are particularly useful in the process of this invention.

According to the present invention, condensation products of the type described in the aforementioned Bellis et al. patent are utilized in a fracturing fluid to provide fluid loss properties and to also provide gel breaking capabilities such that the gel filter pad comprised of condensation product and concentrated gel on the wellbore and fracture surfaces is essentially completely removed, thereby restoring full permeability to the well.

DESCRIPTION OF THE PREFERRED EMBODIMENT

The process of this invention basically is a hydraulic fracturing procedure utilizing as the fracturing fluid an aqueous gel with a specific fluid loss additive in a specific amount.

The fluid loss additives in the present invention comprise inexpensive, low molecular weight condensation products of hydroxyacetic acid with itself or with compounds containing other hydroxy-, carboxylicacid- or hydroxycarboxylic-acid moieties. The condensation products are friable solids with a melting point of about 160° C. or higher and being substantially crystalline at both ambient and wellbore temperatures. They have a number average molecular weight of 200 to 4000 and preferably are oligomers having a number average molecular weight of about 200 to about 650. They are primarily trimers up through decamers. They are insoluble in both aqueous and hydrocarbon media but will degrade at specific rates in the presence of moisture and temperatures above about 50° C. to form oil- and/or water-soluble monomers and dimers. Rate of hydrolysis at a given temperature can be increased by incorporating small amounts of other molecules (usually less than 15% by weight) into the hydroxyacetic acid condensation reaction. These materials are usually flexible or more bulky molecules that partially disrupt crystallinity but leave the condensation product friable. Thus, the treatment agent can be tailored to adjust the rate of hydrolysis from a few hours to several days by controlling the amount and nature of the crystallinity.

As used herein, the term "hydroxyacetic acid condensation product" refers to a material within the description in the preceding paragraph.

The aqueous gels applicable to the present invention include those formed from the gelling agents recited in the aforementioned U.S. Pat. No. 4,470,915. The most commonly used gelling agent, and the preferred one for purposes of this invention, is crosslinked hydroxypropylguar.

The treatment fluid in accordance with the invention comprises an aqueous gel, preferably substantially completely hydrolyzed, and a fluid loss additive comprised at least in part of hydroxyacetic acid condensation product. The amount of condensation product in the treatment fluid is at least that amount which, upon degradation, results in substantial removal of the gel filter pad formed during the fracturing step. For normal fracturing treatments, at least 30 pounds of condensation product per 1,000 gallons of treatment fluid is necessary. Condensation product concentration in treatment fluid refers to the portion of the treatment fluid to which it is added. It is not unusual to use one or more slugs of treatment fluid during the procedure which do not contain the fluid loss additive.

To illustrate the unexpected results obtained by the process of this invention, simulated fracturing treatments using hydroxyacetic acid condensation products were carried out and the results compared to simulated treatments using other fluid loss additive materials. These simulated treatments and the results are described and set forth in the following examples.

FRACTURING TREATMENT SIMULATION PROCEDURES

The fracturing fluid reservoirs for this study were two 55-gallon polyethylene drums manifolded together. The base gel was batch mixed by adding gel and additives to the drum while circulating with a Moyno pump at 20 gal/min. The base gel consisted of 2% KCl+40 pounds per thousand gallons Hi-Tek polymer HP-8 (hydroxypropylguar) with 2½ pounds per thousand gallons fumaric acid and 10 pounds per thousand gallons sodium bicarbonate.

During a fracturing fluid run, the base gel was fed to an open blending device by the Moyno pump where the fluid was stirred with a ribbon shaped stirring device while sodium persulfate and fluid loss additives were added. Delayed titanate crosslinker (0.8 gal Tyzor 101) was added with a syringe pump on the low pressure side of the intensifier system.

The fluid proceeded from the intensifier pumps to a length of ¼ inch tubing where it was sheared at near 1000/sec for 5 minutes to simulate pumping down tubing at 12 barrels per minutes. The fluid then entered a length of 1 inch tubing surrounded by a heating jacket. The shear rate was 40–50/sec while undergoing heat-up to formation temperature. A temperature of 50° C. was selected to represent the average cool down temperature of a point within 50 feet of the wellbore in formations with a bottom hole temperature of 85° C. Residence time in the formation simulator was approximately 5 minutes. With a bottom hole temperature of 85° C., the formation simulator was set at 50° C. to model cooldown.

Once the fluid was heated at 40–50/sec it flowed through the test cell, again at a shear rate of 40–50/sec. Flow was between 2⅜ inch slabs of core that had been saturated with 2% KCl. The leakoff rate through each core was monitored versus time. The fluid traveled to a series of high pressure knock-out pots where the sand-laden fluid was collected and dumped while maintaining a constant pressure of 1000 psi on the system.

A complexed gel pump time of 90 minutes was performed on all reported tests. The time was divided into the following stages:

| Stage | Fluid | Test |
|-------|-------|------|
| 1 | 2% KCl | 10 min |
| 2 | Base Gel | 10 min |
| 3 | Complexed Gel Pad | 90 min |
| 4 | Slurry to pack cell to desired concentration | |

The amount of proppant was selected to provide 2 pounds per square foot in the ⅛ inch slot. The final slurry was flowed into the cell and the cell shut in. The pipe-to-slot flow ends were removed and replaced with inserts containing a ⅛ inch hole with a filter screen to confine proppant to the cell during closure. The top piston setscrews and spacers were removed and closure was applied while heating to 85° C. and monitoring leakoff. A closure of 1000 psi was applied over the course of 30 minutes.

Fluid was leaked off until a net cell pressure of zero was obtained (closure-internal cell pressure=0). This amounted to 23 ml of static leakoff. At this point the cell was shut in at temperature and allowed to set static for 4 hours. After 4 hours, 2% KCl flow was initiated through the core and pack simulating flow back while closure was slowly increased to 4000 psi. Thereafter conductivity and permeability of the pack was monitored versus time for 50 hours.

Using the above procedure, the conductivity, conductivity coefficient Cw, permeability and retained permeability (compared to a control) were determined for treatment fluids containing various fluid loss additives. The results are summarized in Table 1 below. In each run, the base fluid was a 2% KCl plus 40 pounds per thousand gallons crosslinked hydroxypropylguar and test temperature was 185° F., except for the last run in which test temperature was 200° F.

TABLE 1

| Additives (per mgal) | Effective Cw (ft/min$^{\frac{1}{2}}$) | Conductivity (md-ft) | Permeability (darcies) | Retained Permeability (%) |
|---|---|---|---|---|
| 50 pounds HAA** | .0017 | 7919 | 482 | 100 |
| 50 pounds Silica Flour | .0028 | 48 | 3 | 0.6 |
| 50 pounds HAA + 5% Diesel | .0016 | 1873 | 114 | 24 |
| 50 pounds Silica Flour + 5% Diesel | .0011 | 25 | 2 | 0.4 |
| 50 pounds HAA | .0018 | 7853 | 478 | 100 |
| None | .0029 | 67 | 4 | 0.8 |

*Based on control of 472 dercies.
**Hydroxyacetic acid condensation product, 8–10 micron particle size average, melting point 206° C.

The process of this invention can effectively control fluid loss in fracturing operations, and the degradation products (hydroxyacetic acid monomer and dimer) of the fluid loss additive which are produced as a result of the formation conditions break the gel in the gel filter pad and essentially completely remove the gel filter pad with no permanent formation damage.

The hydroxyacetic condensation products can be utilized as the sole fluid loss additive or in combination with other fluid loss additives such as silica flour or diesel fluid. It is only essential that the condensation products be degradable at formation conditions, and that they be used in an amount sufficient to substantially completely break the gel in the gel filter pad which is formed during the fracturing treatment. The condensation products, as shown in the aforementioned Bellis et al. application, can be tailored to suit the conditions in the formation to be fractured. The process eliminates the need for a separate gel breaker injection step. Often, a separately injected gel breaker only contacts a small fraction of the gel pad, resulting in less than full restoration of well productivity or injectivity after the fraction treatment.

Photomicrographs of proppant packs from the tests described above showed essentially complete removal of filter cake when hydroxyacetic acid condensation product was used as the sole fluid loss additive, whereas significant impairment was visible in the run using silica flour as the sole fluid loss additive. The presence of diesel fuel impedes the effectiveness of the degradation products to clean up the gel filter pad, but still a significant amount of gel damage was repaired. The ability of the hydroxyacetic acid condensation product, when used as the sole fluid loss additive, to return a proppant pack to 100% of its potential conductivity and permeability is indeed surprising.

The exact amount and type of additive for a particular fracturing treatment in accordance with the invention will depend on factors such as formation type and temperature, amount of fracturing desired, etc. It is essential in carrying out the invention that a condensed hydroxyacetic acid product in the form of finely divided particles be incorporated in a treatment fluid in an amount sufficient (when combined with other fluid loss additives where applicable) to provide effective fluid loss properties to the fracturing fluid and to provide sufficient degradation products in a reasonable time at formation conditions to restore formation conductivity and permeability by breaking the gel in the gel filter pad formed during the fracturing step.

Numerous modifications to and variations of the above described preferred embodiments will be apparent to those skilled in the art. Such modifications and variations are intended to be included within the scope of the invention as defined by the appended claims.

We claim:

1. In a process for fracturing a subterranean formation penetrated by a wellbore wherein a fracture treatment fluid comprising an aqueous gel is pumped down said wellbore and into said formation at formation fracturing pressure, wherein a fluid loss control material is included in said treatment fluid, and wherein a gel filter cake is formed on the surfaces of said wellbore and the fractures in said formation, the improvement comprising:

utilizing as at least a part of said fluid loss control material a hydroxyacetic acid condensation product, said condensation product being degradable at formation conditions whereby hydroxyacetic acid monomers and dimers are formed, and said condensation product being present in an amount sufficient to provide enough degradation products including hydroxyacetic acid to react with and break the gel in said filter cake and to recover permeability in said formation and fractures without the necessity of adding a separate gel breaking material after formation of said gel filter cake.

2. The process of claim 1 wherein said gel is a hydroxypropylguar gel.

3. The process of claim 1 wherein said hydroxyacetic acid condensation product is a condensation product of hydroxyacetic acid with up to 15 weight percent cocondensing compounds containing other hydroxy-, carboxylic-acid-, or hydroxycarboxylic acid moieties, said condensation product having a number average molecular weight of about 200 to 4000, being substantially crystalline at both ambient and wellbore temperatures and having a melting point of about 160° C. or higher and sufficiently high to avoid softening or melting during use and being substantially insoluble in said wellbore fluid and degradable in the presence of water at elevated temperature to monomers and dimers which are at least partially soluble in oil or water.

4. The process of claim 3 wherein said aqueous gel is fully hydrated prior to being combined with said condensation product.

5. The process of claim 4 wherein said fracture treatment fluid further comprises silica flour.

6. The process of claim 4 wherein said fracture treatment fluid further comprises diesel fuel in an amount of about five volume percent 7. The process of claim 4 wherein said fluid loss control material consists essentially of said condensation product.

8. The process of claim 4 wherein said condensation product is added in an amount of at least 30 pounds per 1000 gallons of treatment fluid.

* * * * *